S. VESSOT & O. RIENDEAU.
WHIP OPERATING ATTACHMENT FOR HAY PRESSES OR THE LIKE.
APPLICATION FILED APR. 12, 1910.
1,002,790. Patented Sept. 5, 1911.
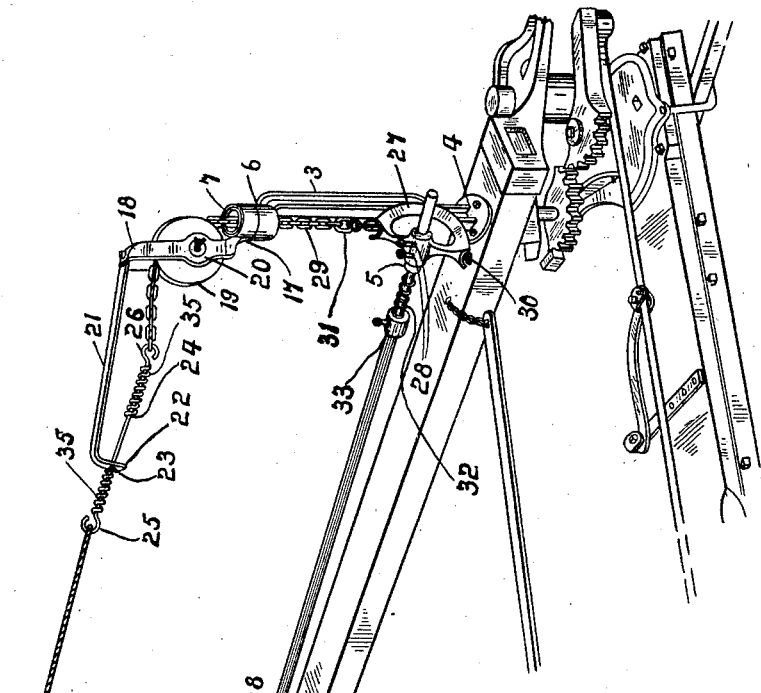
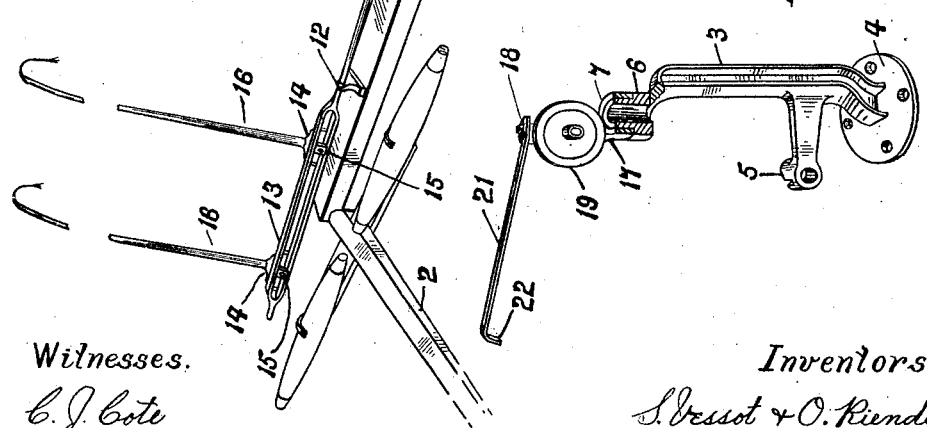
Witnesses.
C. J. Cote
T. Balmer
Inventors.
S. Vessot & O. Riendeau
By Lloyd Blackmore, Atty.

UNITED STATES PATENT OFFICE.

SAMUEL VESSOT AND OCTAVIEN RIENDEAU, OF JOLIETTE, QUEBEC, CANADA.

WHIP-OPERATING ATTACHMENT FOR HAY-PRESSES OR THE LIKE.

1,002,790. Specification of Letters Patent. Patented Sept. 5, 1911.

Application filed April 12, 1910. Serial No. 555,072.

*To all whom it may concern:*

Be it known that we, SAMUEL VESSOT and OCTAVIEN RIENDEAU, subjects of the King of Great Britain, and residing at the town of Joliette, in the Province of Quebec, in the Dominion of Canada, have invented certain new and useful Improvements in Whip-Operating Attachments for Hay-Presses or the Like; and we do hereby declare that the following is a full, clear, and exact description of the same.

The invention relates to improvements in whip-operating attachments for hay presses or the like, as described in the present specification and illustrated in the accompanying drawings that form part of the same.

The invention consists essentially in the novel arrangement and construction of parts, whereby a spring-held whip-holder suitably supported on the beam of the press may be rocked from a distance by means of a chain-pull operatively connected to said whip-holder, and extending over a suitable swivel guide adjacent to the pivoted inner end of the beam.

The objects of the invention are to devise a suitable whipper attachment readily secured to the beam of a hay press or the like, and which will be under the direct control of the operator, who may use the whips only when desired, and thereby prevent accidents which might occur if a boy was employed to drive the horses as customary.

In the drawings, Figure 1 is a perspective view of the attachment secured to the beam of a hay press. Fig. 2 is a vertical sectional view of the swivel supporting the chain-pull.

Like numerals of reference indicate corresponding parts in each figure.

Referring to the drawings, 1 is the draw beam of a hay press or the like, having the tongue 2 secured to the outer end thereof for hitching the horses as customary.

3 is an upright arm having the plate 4 formed at the bottom thereof, and securely bolted to the beam 1 adjacent to its inner end.

5 is a bearing bracket extending outwardly from the arm 3 toward the bottom thereof.

6 is a vertically-extending sleeve formed at the top of the arm 3, and having the reduced upper portion 7.

8 is a length of tube having the inner end thereof extending through the journal bracket 5, and the outer end therof fitted with the collar 9 and set-screw 10.

11 is a rod slidably arranged in the tube 8, and supported by the brackets 12 secured to the beam 1 toward the outer end thereof. The rod 11 is firmly secured at the inner end thereof in the tube 8 by the set-screws 10, and at the outer end thereof is formed with a longitudinal slot 13.

14 are split clamps adjustably secured in the slot 13 by the nuts 15, and forming sockets in which the whips 16 are secured in substantially vertical position.

17 is a collar rotatably mounted on the reduced upper end 7 of the sleeve 6, and having the bracket 18 projecting therefrom.

19 is a grooved pulley journaled on the pin 20 in the bracket 18, and supporting the said pulley, so that the groove thereof on one side is in direct vertical alinement with the orifice of the sleeve 6.

21 is a guide bar secured to the top of the bracket 18, and having the downwardly-extending outer end 22.

23 is an orifice through the downwardly-extending end 22 of the guide bar 21.

24 is a link rod extending through the orifice 23, and having the eyes 25 and 26 formed at the extremities thereof.

27 is a grooved pulley segment fixedly secured by the set-screws 28 to the inner end of the tube 8.

29 is a chain secured to the grooved pulley segment 27 at 30, and extending around said segment, and upwardly through the sleeve 6, and over the pulley 19, where it is secured to the eye 26 of the rod 24, a swivel 31 being provided intermediate of the length of said chain, in order that the same will not become twisted by the rotation of the draw beam.

32 is a spiral spring encircling the tube 8 at the inner end thereof, and having one end caught in a suitable notch in the journal bracket 5, and the other end thereof caught in a suitable notch in the collar 33 secured to the tube 8, said spring normally retaining the tube 8 and the rod 11, so that the whips 16 are substantially in a vertical position.

34 is a rope secured to the eye 25 of the link rod 24, and extending to an overhead pulley in proximity to the operator of the press, so that the operator may pull on the rope 34, and through the connection thereof with the link rod 24 and chain 29 will rotate the grooved pulley segment 30, and rock the tube 8, and the rod 11, and throw the whips forward to whip up the horses when desired, the spring 32 returning the said rod and connections to their normal position on the release of the rope 34 by the operator.

Small coil springs 35 are provided on the link rod 24 at each end thereof to ease off the action of any pull of the rope 34 on the several parts of the device, and also the return of the same by the action of the spring 32.

It will be readily understood that the horses draw the arm 3 around with the beam 1, but the collar 17 is free to rotate on the reduced upper end 7 of the sleeve 6, and the guide bar 21, through which the link rod extends, holds the said collar 17 from turning while the swivel 31 of the chain 29 relieves any twist from said chain.

What we claim as our invention is:

1. In a whip-operating attachment for hay presses or the like, the combination with the draw beam, of a whip-holder supported by said beam toward the outer end thereof, a whip secured to said holder, a swivel member supported at the inner end of said beam, means operatively connecting said swivel member with said whip-holder for rocking the same and a line extending from a distance to said swivel member.

2. In a whip-operating attachment for hay presses or the like, the combination with the draw beam, of a plurality of journal brackets secured thereto, an extensible rod supported by said brackets, a whip clamped to the outer end of said rod, a spiral spring encircling said rod and normally holding said whip in a substantially vertical position, a swivel secured to the inner end of said beam, a pulley journaled in said swivel and a chain-pull extending over said pulley and operatively connected to said rod for rocking the same in said bearings.

3. In a whip-operating attachment for hay presses or the like, the combination with the draw beam, of a plurality of brackets secured to said beam, an upright arm secured to the inner end of said beam and having a bearing bracket extending therefrom, a rod journaled in said bracket and having a slotted outer end, a clamp adjustably arranged in the slotted outer end of said rod, a whip secured in said clamp, a grooved pulley segment secured to the inner end of said rod, a swivel bracket mounted on the upper end of said arm, a grooved pulley journaled in said swivel bracket, a guide bar secured to said swivel bracket and having an orifice in the outer end thereof, a link rod extending through the orifice in said guide bar, a chain-pull secured to one end of said link rod and extending over said pulley and secured to said pulley segment and a rope secured to said link rod.

4. In a whip-operating attachment for hay presses or the like, the combination with a whip rod rotatably supported by said beam, a whip secured to the outer end of said rod, an upright arm secured to the inner end of said beam and having a sleeve formed at the top thereof, a collar swivelly mounted on said sleeve and having a bracket extending therefrom, a grooved pulley journaled in said bracket, a guide bar extending from said bracket and having an orifice at the outer end thereof, a link rod extending through the orifice in the guide rod and having eyes formed at the extremities thereof, spiral springs encircling said link rod toward each end thereof, a grooved pulley segment secured to said whip rod at the inner end thereof, a chain extending over said pulley and connecting the inner end of said link rod with said pulley segment, a swivel link included in said chain and a rope secured to the outer end of said link rod.

5. In a whip-operating attachment for hay presses or the like, the combination with the draw beam, of a plurality of brackets secured to said beam, an upright arm secured to the inner end of said beam and having a bearing bracket extending therefrom, a pulley swivelly secured to said upright arm, a length of tube journaled at one end thereof in the bracket extending from said arm, a collar fixedly secured in said tube, a spiral spring encircling said tube and having one end thereof secured to said collar and the other end thereof secured to said arm bracket, a bar adjustably arranged in said tube and having the outer end thereof journaled in the brackets secured to said beam, a split clamp secured to the outer end of said bar, a whip secured in said split clamp and a chain-pull secured to the inner end of said tube and extending over said pulley and a line extending from a distance and secured to said chain-pull.

Signed at the town of Joliette this third day of March 1910.

SAMUEL VESSOT.
OCTAVIEN RIENDEAU.

Witnesses:
FRÉDÉRIC COZA,
C. G. H. BEAUDOIN.